US008742625B2

(12) United States Patent
Baarman et al.

(10) Patent No.: US 8,742,625 B2
(45) Date of Patent: Jun. 3, 2014

(54) MULTIPHASE INDUCTIVE POWER SUPPLY SYSTEM

(75) Inventors: David W. Baarman, Fennville, MI (US); Warren E. Guthrie, West Olive, MI (US); Paul Duckworth, Holland, MI (US)

(73) Assignee: Access Business Group International LLC, Ada, MI (US)

( * ) Notice: Subject to any disclaimer, the term of this patent is extended or adjusted under 35 U.S.C. 154(b) by 1039 days.

(21) Appl. No.: 12/680,349

(22) PCT Filed: Sep. 25, 2008

(86) PCT No.: PCT/US2008/077674
§ 371 (c)(1),
(2), (4) Date: Aug. 2, 2010

(87) PCT Pub. No.: WO2009/045847
PCT Pub. Date: Apr. 9, 2009

(65) Prior Publication Data
US 2010/0314947 A1    Dec. 16, 2010

Related U.S. Application Data

(60) Provisional application No. 60/976,137, filed on Sep. 28, 2007.

(51) Int. Cl.
*H04B 5/00* (2006.01)
(52) U.S. Cl.
CPC ............ *H04B 5/0087* (2013.01); *H04B 5/0031* (2013.01); *H04B 5/0037* (2013.01); *H04B 5/0025* (2013.01)
USPC ........................................................ 307/104

(58) Field of Classification Search
CPC .. H04B 5/0025; H04B 5/0031; H04B 5/0037; H04B 5/0087
USPC ........................................................ 307/104
See application file for complete search history.

(56) References Cited

U.S. PATENT DOCUMENTS 4,238,688 A * 12/1980 Boettcher et al. ............... 307/20
4,665,322 A * 5/1987 Eishima et al. .................. 307/66
(Continued)

FOREIGN PATENT DOCUMENTS

EP        466949 A1 *  1/1992  ............... G06K 7/08
GB        2117579        10/1983
(Continued)

OTHER PUBLICATIONS

Joep Jacobs, Andreas Averberg and Rik De Doncker, Multi-Phase Series Resonant DC-To-DC-Converters: Stationary Investigations, Power Electronics Specialists Conference, 2005, Jan. 1, 2005, pp. 660-666.
(Continued)

*Primary Examiner* — Adi Amrany
(74) *Attorney, Agent, or Firm* — Warner Norcross & Judd LLP

(57) ABSTRACT

A multiphase inductive power supply wirelessly transmits power in multiple phases. A primary circuit energizes multiple tank circuits in an out of phase relationship. A secondary circuit receives the power and recombines the power. The amount of energy in each phase is reduced compared to transferring the same amount of power using a single phase inductive power supply.

15 Claims, 4 Drawing Sheets

(56) References Cited

U.S. PATENT DOCUMENTS

| | | | |
|---|---|---|---|
| 5,202,664 | A | 4/1993 | Poulsen |
| 6,548,985 | B1 | 4/2003 | Hayes et al. |
| 6,650,213 | B1 | 11/2003 | Sakurai et al. |
| 6,825,620 | B2 | 11/2004 | Kuennen et al. |
| 7,212,414 | B2 | 5/2007 | Baarman |
| 7,432,622 | B2 | 10/2008 | Griepentrog et al. |
| 7,952,324 | B2 * | 5/2011 | Cheng et al. .............. 320/108 |
| 2003/0090440 | A1 | 5/2003 | Marcotte |
| 2005/0212634 | A1 | 9/2005 | Baldwin et al. |
| 2007/0287508 | A1 | 12/2007 | Telefus |
| 2008/0116847 | A1 * | 5/2008 | Loke et al. .............. 320/108 |
| 2009/0127937 | A1 * | 5/2009 | Widmer et al. .............. 307/149 |
| 2009/0284369 | A1 * | 11/2009 | Toncich et al. .............. 340/539.3 |

FOREIGN PATENT DOCUMENTS

| | | |
|---|---|---|
| JP | 61-226887 | 10/1986 |
| JP | 04-001096 | 1/1992 |
| WO | WO2004/021376 | 3/2004 |
| WO | WO2004/073166 | 8/2004 |
| WO | 2007042953 | 4/2007 |
| WO | 2007146223 | 12/2007 |

OTHER PUBLICATIONS

International Search Report, International Application No. PCT/US2008/077674, International Filing Date Sep. 25, 2008.

* cited by examiner

MULTIPHASE INDUCTIVE POWER SUPPLY SYSTEM

BACKGROUND OF THE INVENTION

The present invention relates to electromagnetic coupling, and more particularly to inductive couplings for wirelessly providing power to a remote device.

There is an increasing demand for wireless power supply to remote devices, such as cell phones, digital music players, personal digital assistants and other similar electronic devices. As the use of handheld electronics continues to grow, so does the associated need for wireless power supply. Typical handheld electronics utilize a removable power supply cord that permits the device to be selectively coupled to a power source. Power supply cords are inconvenient and suffer from a variety of other problems. For example, a user is required to locate and attach the power supply cord each time that the device needs to be charged. Unless a user is willing to purchase multiple power supply cords or carry around a single power supply cord, the user must return to a single location to charge the device. As another example, power supply cords occupy a fair amount of space and are messy to store. Power cords and any associated power supply circuitry can present significant additional cost to the user. Although even a single power cord presents significant problems, the problems are compounded exponentially for those individuals or organizations that need to control power for a collection of remote electronic devices.

To address this issue, a variety of technologies have been developed to wirelessly supply power to remote devices. These technologies typically involve the use of electromagnetic coupling (or inductively coupling) that provides a wireless bridge between the power supply and the remote device. For example, U.S. Pat. No. 6,825,620 entitled, "Inductively Coupled Ballast Circuit", U.S. Pat. No. 7,212,414, entitled "Adaptive Inductive Power Supply", and U.S. patent application Ser. No. 10/689,148 entitled "Adaptive Inductive Power Supply with Communication" are directed to particularly efficient inductive coupling technology in which the power supply adjusts to the power supply needs of the remote device based on feedback from the remote device through the inductive coupling. These patents are incorporated herein by reference in their entirety.

Although inductive coupling technology has made significant progress over the last decade, there will always be a desire for greater efficiency, improved performance and smaller components.

SUMMARY OF THE INVENTION

The present invention provides a multiphase inductive coupling for wirelessly conveying power to a remote device. In one embodiment, the inductive coupling includes a primary circuit with a plurality of discrete tank circuits and a controller for energizing the tank circuits in an out of phase relationship. Each tank circuit includes a primary inductive coupler, typically a coil. The inductive coupling also includes a secondary circuit with a plurality of secondary inductive couplers, also typically coils. Each secondary coil is uniquely paired with a primary coil to establish a plurality of paired coils. The secondary coil also includes a rectifier for converging the multiphase power and converting it into DC power.

In one embodiment, the primary circuit includes three discrete tank circuits and a controller for driving the three tank circuits out of phase from each other. In this embodiment, the secondary circuit includes three secondary coils that are arranged in close proximity to the paired primary circuit coil.

By wirelessly transferring power using multiple phases, the current required in each phase is reduced. Accordingly, the overall loss of power in the wireless transfer may be reduced compared to a single phase wireless power transfer. Further, smaller components may be used to implement a multiphase inductive power supply system. Smaller components and less current loss typically results in reduced heat generation, which is desirable in most circuits.

These and other objects, advantages, and features of the invention will be readily understood and appreciated by reference to the detailed description of the current embodiment and the drawings.

DESCRIPTION OF THE CURRENT EMBODIMENT

The present invention is directed to a multiphase inductive power supply system that is capable of providing power to a wide variety of electrically powered components in numerous applications. For purposes of disclosure, embodiments of the multiphase inductive power supply system will be described in connection with a generic single phase load, though this multiphase circuit could be used in connection with the powering of a multiphase load. Although described in connection with a generic load, the present invention is well-suited for use in providing power to cell phones, digital music players, personal digital assistants and other electronic devices, to name only a few.

Figure 2:
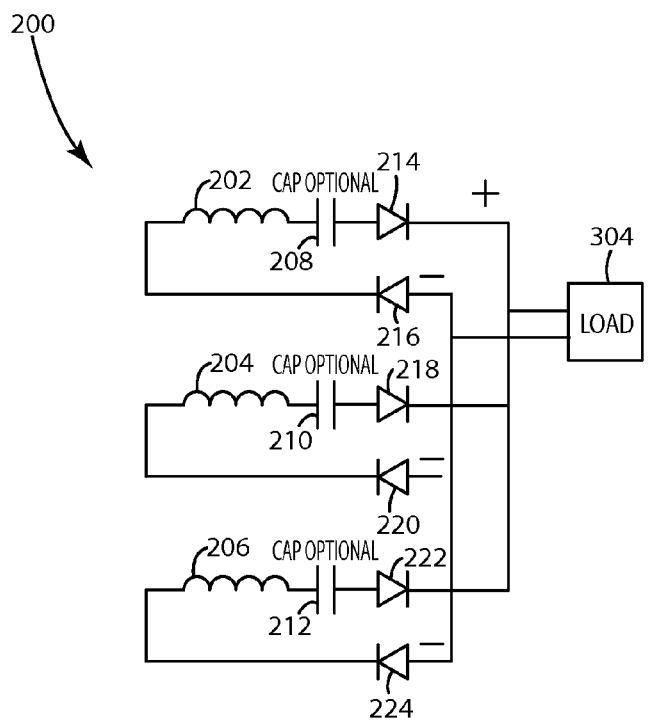
FIG. 2 is a circuit diagram of one embodiment of a multiphase inductive secondary circuit.
Figure 3:
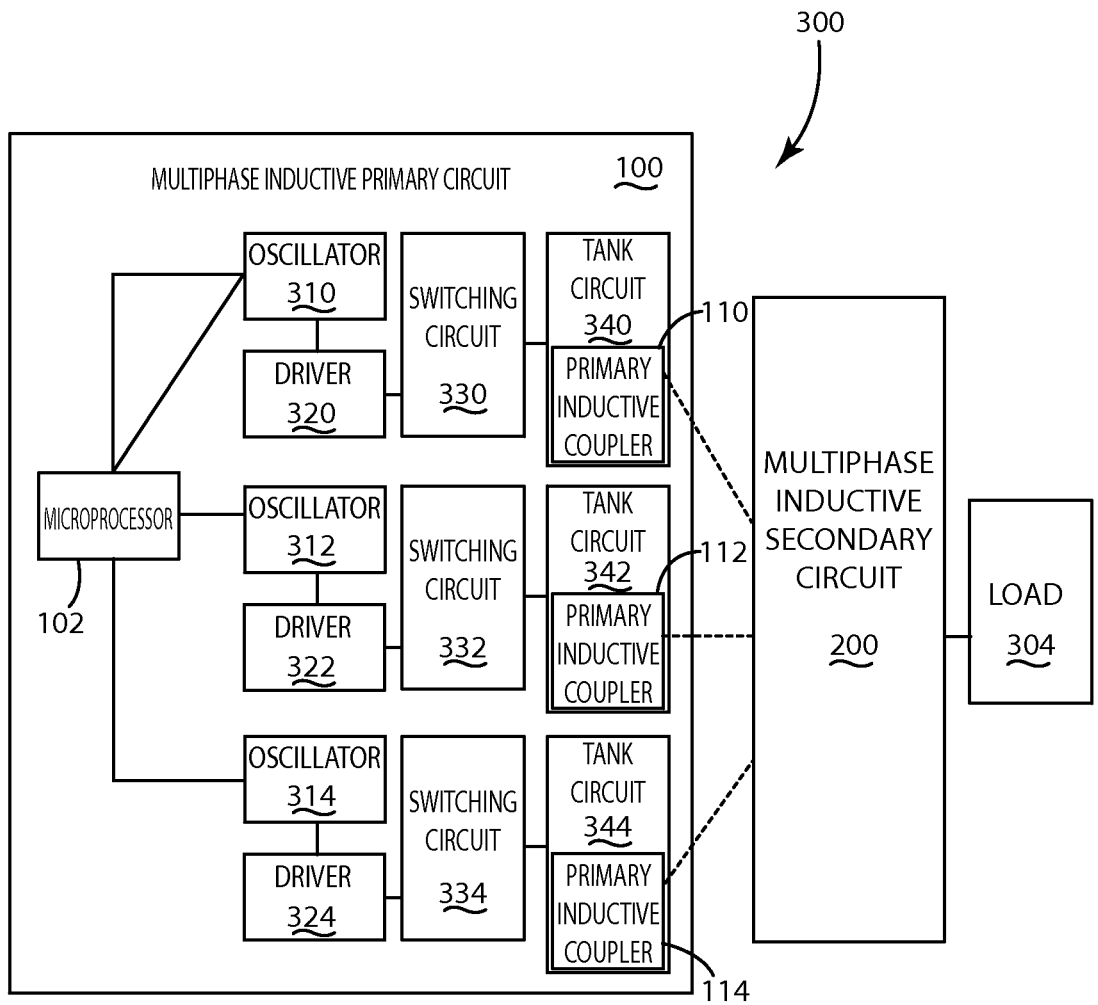
FIG. 3 is a block diagram of one embodiment of a multiphase inductive power supply system.

Referring to FIG. 3, the present invention, as shown in the illustrated embodiment, discloses a multiphase inductive power supply system 300. Various embodiments of the multiphase inductive primary circuit are illustrated in the circuit diagram of FIG. 1 and the block diagrams of FIGS. 3 and 5, and generally designated 100. Various embodiments of a multiphase inductive secondary circuit 200 are illustrated in the circuit diagram of FIG. 2 and the block diagram of FIG. 6. In general, the multiphase inductive power supply system 300 separates power in the multiphase inductive primary circuit 100 into multiple phases and wirelessly transfers the power to the multiphase inductive secondary circuit 200 via inductive coupling. In the illustrated embodiments, the multiphase inductive secondary circuit 200 recombines the transferred power into a single phase and applies it to the a load 304. In alternative embodiments, the multiphase inductive primary circuit 100 may be integrated into a power supply or it may be implemented as a stand alone device which accepts an external power source. The multiphase inductive secondary circuit 200 may be integrated directly into virtually any load 304 or, alternatively, built into an adapter for load 304.

In the embodiment illustrated in FIG. 3, the multiphase inductive primary circuit 100 includes a microprocessor 102, three oscillators 310, 312, 314, three drivers 320, 322, 324, three switching circuits 330, 332, 334 and three tank circuits 340, 342, 344 each with a primary inductive coupler 110, 112, 114. In general, during operation, the microprocessor signals each of the oscillators 310, 312, 314 in an out of phase relationship to separate the power into three phases. For example, when oscillator 310 receives a signal from the microprocessor 102 the oscillator 310 provides an oscillating signal to the driver 320 to which it is electrically connected. The driver 320 energizes the switching circuit 330 to which it is electrically connected, which in turn provides alternating current to the tank circuit 340 ultimately providing one phase of power to the multiphase inductive secondary circuit 200 via the inductive coupler 110. Similarly, a second signal from the microprocessor, delayed in time from the first, to a second oscillator 332 generates an oscillating signal for driver 322 which energizes switching circuit 332 and produces a second phase of power in the second tank circuit 342 that is transmitted to the multiphase inductive secondary circuit 200 via the inductive coupler 112. Similarly, a third signal from the microprocessor 102, delayed further in time from the second, to a third oscillator 314 generates an oscillating signal for driver 324 which energizes switching circuit 334 and produces a third phase of power in the third tank circuit 344 that is transmitted to the multiphase inductive secondary circuit 200 via the inductive coupler 114.

Figure 1:
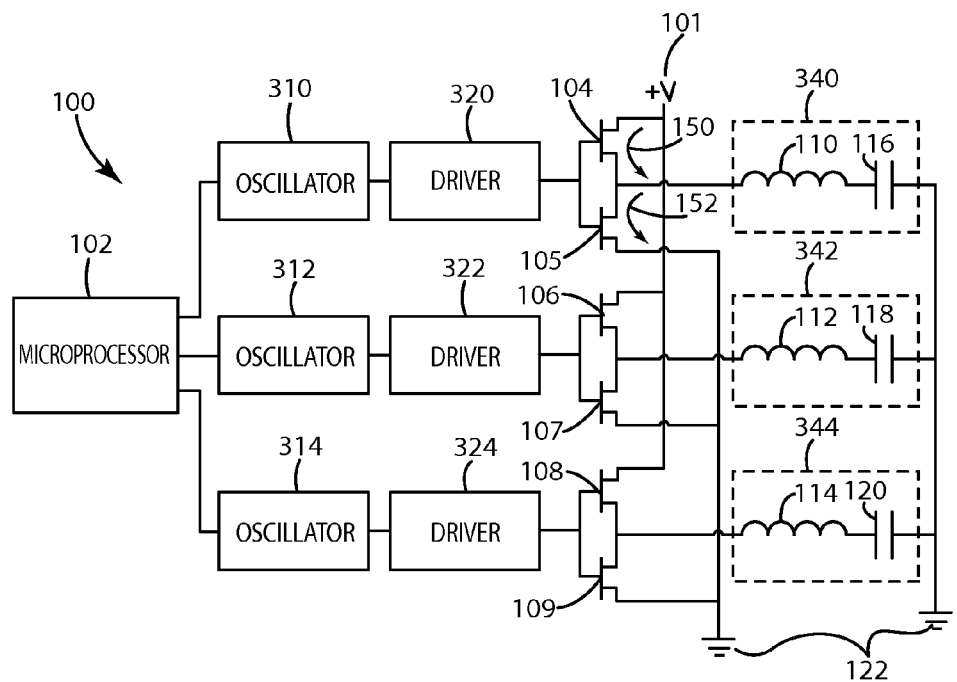
FIG. 1 is a circuit diagram of one embodiment of a multiphase inductive primary circuit.

One embodiment of a multiphase inductive primary circuit 100 is illustrated in the circuit diagram of FIG. 1. The multiphase inductive primary circuit 100 includes a microprocessor 102, three oscillators 310, 312, 314, three drivers 320, 322, 324, three half bridge switching circuits each constructed from a pair of MOSFETs 104-109, a DC power source 101, a common ground 122 and three tank circuits 340, 342, 344. Alternative embodiments may include additional or different components. For example, the multiphase inductive primary circuit 100 may include additional microprocessors, power sources, drivers and tank circuits.

Figure 5:
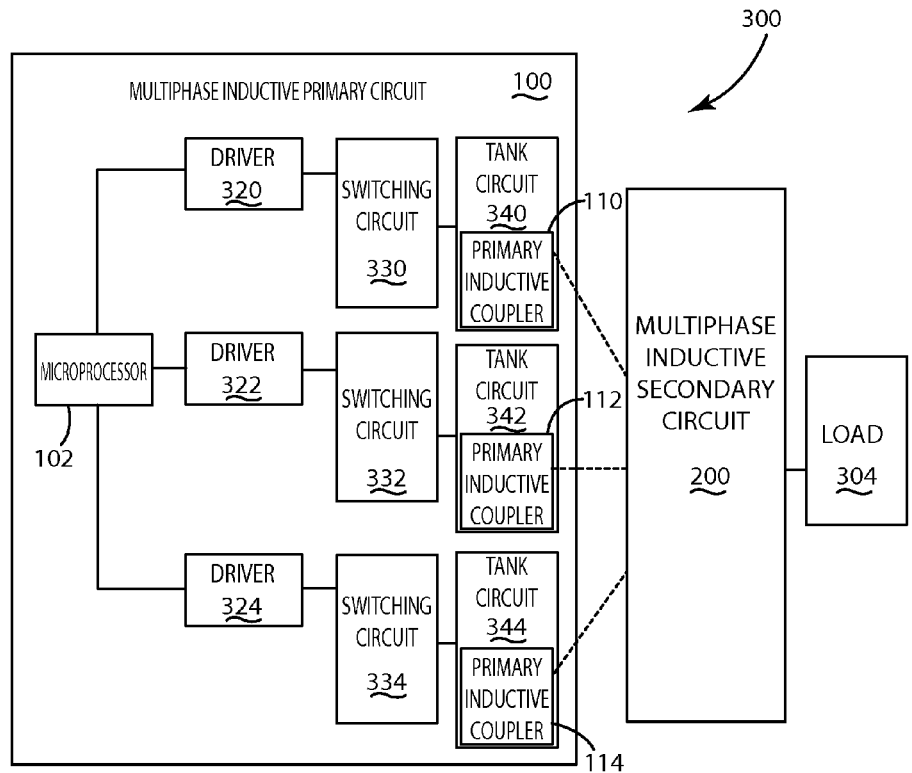
FIG. 5 is a block diagram of one embodiment of a multiphase inductive power supply system.

Microprocessor or control unit 102, in the illustrated embodiment of FIG. 1, controls the multiphase inductive primary circuit 100. The microprocessor 102 is electrically connected with each of the oscillators 310, 312, 314. Alternatively, if the microprocessor 102 includes or acts as an oscillator, as shown in FIG. 5, the microprocessor 102 is electrically connected with each of the drivers 320, 322, 324 and the oscillators are removed from the circuit. The microprocessor is programmed to generate signals using appropriate timing in order to generate three phase power in the multiphase inductive primary circuit 100. During operation, the microprocessor 102 is capable of generating separate predetermined electric signals that are directed to each of the drivers 320, 322, 324, which ultimately energize the load 304.

Oscillators 310, 312, 314 and drivers 320, 322, 324 are generally conventional components that a person of skill in the art would recognize, as such they will not be discussed in detail. In the embodiment illustrated in FIG. 1, the oscillator may be implemented with a conventional assortment of op amps, FETs and resistors. In the embodiment illustrated in FIG. 1, the may be a conventional multi-winding transformer. In alternative embodiments, the drivers and oscillators may be configured differently or include different components. In the embodiment illustrated in FIG. 5, instead of an oscillator for each phase, there is a single oscillator onboard the microprocessor 102, as described above. In the FIG. 5 embodiment, the microprocessor is electrically coupled to each driver 320, 322, 324 and the onboard oscillator signal is shifted in time inside the microprocessor, if necessary, before being transmitted to each driver.

Each of the switching circuits of the embodiment illustrated in FIG. 1 is a half bridge switching circuit implemented with a pair of n-channel MOSFETs. Specifically, the drain of MOSFET 104 is connected to the DC power source 101, the source of MOSFET 104 is connected to tank circuit 340 and the gate of MOSFET 104 is connected to driver 320. The drain of MOSFET 105 is connected to the tank circuit 340, the source of MOSFET 105 is connected to the common ground 122, and the gate of MOSFET 105 is connected to driver 320. The drain of MOSFET 106 is connected to the DC power source 101, the source of MOSFET 106 is connected to tank circuit 342 and the gate of MOSFET 106 is connected to driver 322. The drain of MOSFET 107 is connected to the tank circuit 340, the source of MOSFET 107 is connected to the common ground 122, and the gate of MOSFET 107 is connected to driver 322. The drain of MOSFET 108 is connected to the DC power source 101, the source of MOSFET 108 is connected to tank circuit 342 and the gate of MOSFET 108 is connected to driver 324. The drain of MOSFET 109 is connected to the tank circuit 340, the source of MOSFET 109 is connected to the common ground 122, and the gate of MOSFET 109 is connected to driver 324. This is merely one type of switching circuit using one specific configuration. Other switching circuits or different configurations of the half-bridge switching circuits may be implemented. For example, in one alternative embodiment the half bridge switching circuit is a three way switch or pair of switches. In another alternative embodiment, the half-bridge switching circuit is implemented with BJTs, vacuum tubes, relays, other types of transistors, or a diode circuit, among other things.

Those skilled in the art of electronics would recognize that the DC power source 101 is well known in the art and beyond the scope of the present invention. For the purposes of the present invention, it is important to note that such circuits exist and are capable of being designed to produce various DC voltage values from a given AC or DC power source. In the illustrated embodiment, a +19 V signal is used. Those skilled in the art would recognize that the circuits could be designed to operate on different DC voltage levels and that these values should not be construed as a limitation on the present invention. In one embodiment, the DC power source 101 is a capacitor. In another embodiment, the DC power source 101 is a battery. In yet another embodiment, the DC power source 101 is a converted AC power source, such as from a wall outlet.

Each tank circuit 340, 342, 344 in the current embodiment is a series resonant tank circuit. Each series resonant tank circuit 340, 342, 344 includes a primary inductive coupler 110, 112, 114 and a tank capacitor 116, 118, 120. Each primary inductive coupler 110, 112, 114 is connected to its respective switching circuit and tank capacitor 116, 118, 120 in series. Each tank capacitor 116, 118, 120 is also connected with the common ground 122. The tank circuits may include additional circuit components or may be arranged in a different configuration. For example, in the current embodiment, the position of each of the tank capacitors is interchangeable with its respective inductive coupler. Although the illustrated embodiment shows three tank circuits, additional or fewer tank circuits may be used. For example, in an alternative embodiment, two phase power may be implemented by removing one of the tank circuits and its related components and configuring the microprocessor accordingly. Further, this invention may be used in conjunction with the printed circuit board coil described in U.S. provisional application entitled "PRINTED CIRCUIT BOARD COIL" filed on Sep. 28, 2007 by Paul Duckworth, Warren Guthrie, Dave Baarman, Joshua Schwannecke. For example, each inductive coupler on the primary and secondary may be implemented as a printed circuit board litz wire.

During operation, the microprocessor 102 controls the timing of the oscillators 310, 312, 314 such that the tank circuits 340, 342, 344 are energized in staggered phases. In one embodiment of the three phase system, the three tank circuits each carry an alternating current of the same frequency which reaches its instantaneous peak current at different times. Using the current in one tank circuit as a reference, the other two currents in the other two tank circuits are delayed in time by one-third and two-thirds of one cycle of the electrical current. This delay between "phases" has the effect of giving constant power transfer over each cycle of the current once recombined in the multiphase inductive secondary circuit 200.

The timing programmed in the microprocessor 102 to create the multiphase power in the multiphase inductive primary circuit 100 may vary based on a number of factors, including, but not limited to, the desired number of phases of power, the size of the components, heat generation, the load, efficiency tolerance, the desired characteristics of the output power and other factors. In one embodiment, only one of the tank circuits is energized at any given period in time. In another embodiment, the tank circuits are energized such that each phase of power in the tank circuits is in an equally offset, out of phase relationship.

Referring to FIG. 1, the flow of current during operation of the illustrated embodiment may be recognized. Arrow 150 shows that when switch 104 is closed, current is allowed to flow from the DC power source 101 toward the tank circuit capacitor 116. Arrow 152 shows that when switch 105 is closed, current is allowed to flow from tank circuit capacitor 116 to the common ground 122. Because of the circuit configuration of the illustrated embodiment, switch 105 is open whenever switch 104 is closed and vice versa. Hence, when switch 104 is closed current flows to and charges tank circuit capacitor 116 and when switch 105 is closed, the tank circuit capacitor 116 discharges and current flows in the opposite direction toward the common ground 122. In general, the inductive coil 110 is energized with alternating current as the tank capacitor 116 charges and discharges. The frequency of the alternating current is determined by the timing of the switches 104, 105. In the illustrated embodiment, the same relationship exists with the other two pairs of switches 106-109.

During operation, in the current embodiment, the microprocessor 102 controls the timing of the MOSFETs 104-109 in order to separate the current from the direct current power source 101, into three phases. Specifically, microprocessor 102 begins the transfer of power by operating the MOSFETs 104, 105 in order to generate AC power at a certain frequency across tank circuit 340. In the current embodiment, the microprocessor 102 begins operating the MOSFETs 106, 107 after one third of the frequency has passed in order to generate a second phase of power. The microprocessor 102 begins operating the MOSFETs 108, 109 after two thirds of the frequency has passed in order to generate a third phase of power. Essentially, each phase of power is offset by 120 degrees. The same offset phase relationship is recognized in the multiphase inductive secondary circuit. That is, each tank circuit 340-344 transfers power to one of the respective inductive coils 202, 204, 206, and the multiphase power is maintained through induction. In alternative embodiments, the phases may be offset by different amounts. For example, the phases may be offset by 30 degrees instead of 120. Further, additional phases of power may be realized by adding additional tank circuits along with accompanying circuitry. For example, five phase power may be realized by including five tank circuits, five drivers, five switching circuits instead of three. In the five phase power embodiment, each tank circuit is shifted in time by ⅕ of the frequency. In order to maximize efficient power transfer in the five phase embodiment, the secondary circuit would likely, but not necessarily, include five inductive couplers instead of three.

Figure 6:
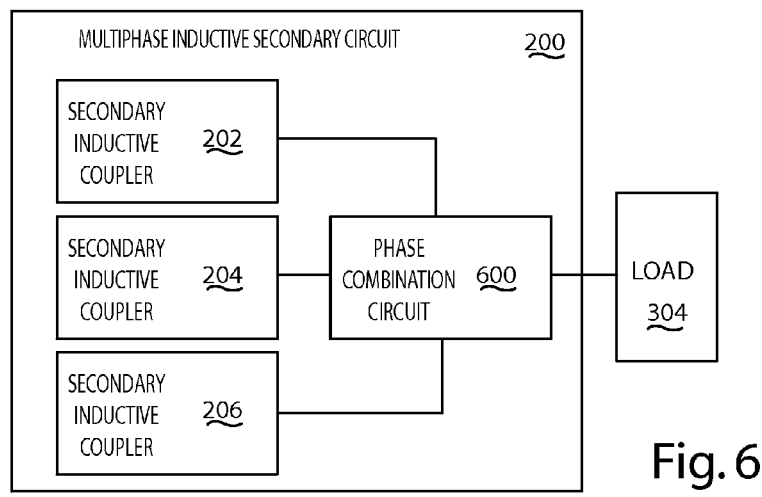
FIG. 6 is a block diagram of one embodiment of a multiphase inductive secondary.

Referring to FIG. 6, the multiphase inductive secondary circuit 200 includes three secondary inductive couplers 202, 204, 206 each electrically coupled to a phase combination circuit 600. The phase combination circuit 600 recombines the phases of power and provides single phase power to load 304. In an alternative embodiment, the phase combination circuit is removed and the load 304 is powered by multiphase power. Generally, the number and arrangement of secondary inductive couplers matches the number and arrangement of primary inductive couplers, though that need not necessarily be the case.

In the illustrated embodiment of FIG. 2, a multiphase inductive secondary circuit 200 implementing a half bridge rectification circuit to recombine the multiphase power is shown. The multiphase inductive secondary circuit 200 of the illustrated embodiment includes three inductive coils 202, 204, 206, three optional capacitors 208, 210, 212 and six diodes 214-224. Although the current embodiment is implemented using half bridge rectification to combine the multiphase power, other rectification or combining techniques may be used. For example, in one alternative embodiment, center tapped rectification may be used instead of half bridge rectification.

In the half bridge rectification embodiment, illustrated in FIG. 2, each inductive coil 202, 204, 206 is connected to the anode of a diode 214, 218, 222 from a first group and the cathode of a diode 216, 220, 224 from a second group. The cathodes of each of the first group of diodes 214, 218, 222 are connected together to form the positive terminal for the single phase load 304 and the anodes of each of the second group of diodes 216, 220, 224 are connected together to form the negative terminal for the single phase load 304.

As discussed above, each of the primary inductive coils 110, 112, 114 in the multiphase inductive primary circuit 100 inductively couples to the inductive coils 202, 204, 206 in the multiphase inductive secondary circuit 200.

In the embodiments described above, it is assumed the inductive couplers in the primary 110, 112, 114 and the inductive couplers in the secondary 202, 204, 206 are substantially aligned. The primary and secondary optionally include alignment mechanisms, such as magnets or indentations and protrusions. In alternative embodiments, alignment occurs naturally by placing the primary and secondary in sufficient proximity. However, perfect alignment is not necessary for the multiphase inductive power supply system 300 to operate.

Figure 4A:
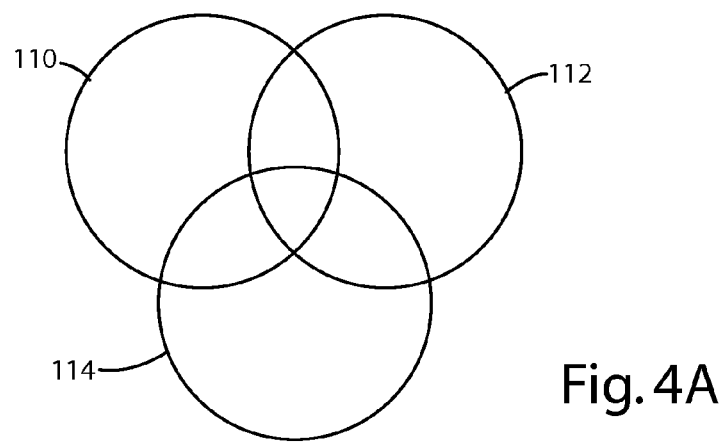
FIG. 4A is a diagram showing an arrangement of coils.
Figure 4B:
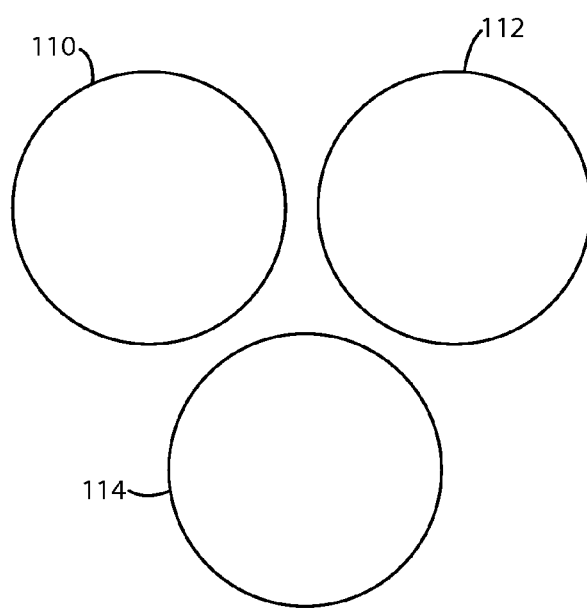
FIG. 4B is a diagram showing another arrangement of coils.
Figure 4C:
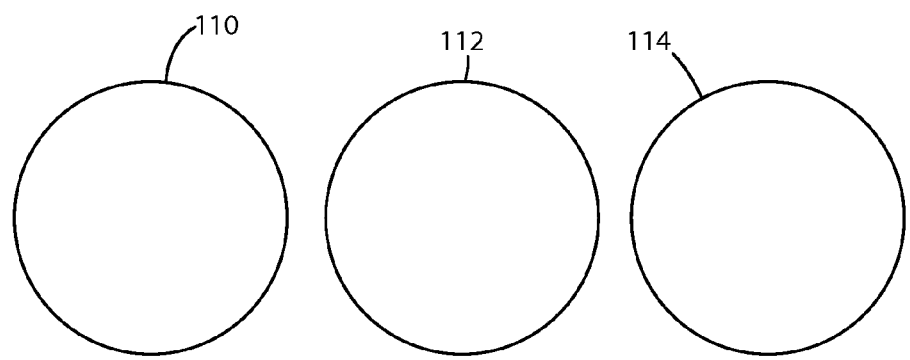
FIG. 4C is a diagram showing another arrangement of coils.

Further, the arrangement of the primary and secondary inductive couplers in many embodiments facilitates multiphase power transfer. For example, in the embodiment illustrated in FIG. 4A, the primary inductive coils 110, 112, 114 are arranged in a tight overlapping triangular relationship. The overlapping arrangement causes voltage from the adjacent primary coils to cancel. This results in substantially zero mutual inductance and allows each coil to operate independently while also allowing the coils to take up less physical space. Typically, but not necessarily, the inductive couplers of the secondary 202, 204, 206 are arranged in a pattern which matches that of the inductive couplers of the primary 110, 112, 114. In other embodiments, the coils are purposely isolated. For example, in the embodiment illustrated in FIG. 4B, the primary coils 110, 112, 114 are arranged in a loose, non-overlapping, triangular pattern, equidistant from one another. In the embodiment illustrated in FIG. 4C, the primary coils 110, 112, 114 are arranged in a loose linear fashion. One advantage of an isolated coil arrangement is that the effect of misalignment is reduced. Regardless of the coil arrangement, the primary and secondary coils need not be substantially aligned to transfer power inductively. In scenarios where the multiphase inductive primary circuit 100 and the multiphase inductive secondary circuit 200 are slightly misaligned, the phase relationship is generally maintained, though the power in each phase may be reduced.

By separating the power into separate phases across multiple tank circuits, a similar amount of power, and in some cases more power, may be transferred to the secondary with fewer losses than in a single phase inductive system at the same voltage. Further, in many embodiments, smaller components may be used than in a single phase inductive system.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A multiphase inductive power supply system comprising:
   a DC power source;
   a ground;
   a microprocessor;
   a plurality of tank circuits, wherein each tank circuit includes a primary inductive coupler and a capacitor;
   a plurality of oscillators, wherein each of said plurality of oscillators is electrically coupled to said microprocessor, wherein said microprocessor signals each of said plurality of oscillators to produce an oscillating signal in an out of phase relationship from each other of said plurality of oscillators, wherein said microprocessor signals each of said plurality of oscillators to vary a timing of said oscillating signal based on feedback from a remote device;
   a plurality of drivers, wherein each of said plurality of drivers is electrically coupled to at least one of said plurality of oscillators;
   a plurality of switching circuits, wherein each of said plurality of switching circuits is electrically coupled to at least one of said plurality of drivers and wherein each of said plurality of switching circuits selectively electrically couples said DC power source or said ground to one of said tank circuits to generate alternating current, wherein each alternating current is in said out of phase relationship;
   a multiphase inductive secondary circuit connected to said remote device with a plurality of secondary inductive couplers, wherein each of said plurality of secondary inductive couplers inductively couples to at least one of said primary inductive couplers in each of said plurality of tank circuits, wherein each of said plurality of secondary inductive couplers generates current in said out of phase relationship, wherein said remote device provides said feedback through said inductive coupling;
   a phase combination circuit electrically coupled to said plurality of secondary inductive couplers for combining said generated out of phase currents.

2. The multiphase inductive power supply system of claim 1 wherein said plurality of primary inductive couplers are arranged in a tight overlapping triangular relationship so that voltage from adjacent primary inductive couplers cancels.

3. The multiphase inductive power supply system of claim 1 wherein said plurality of secondary inductive couplers are arranged in a tight overlapping triangular relationship.

4. The multiphase inductive power supply system of claim 1 wherein said plurality of primary inductive couplers are arranged in a loose, linear fashion.

5. The multiphase inductive power supply system of claim 1 wherein said plurality of primary inductive couplers are arranged in a loose, non-overlapping, triangular fashion.

6. The multiphase inductive power supply system of claim 1 wherein the phase of each oscillator signal is offset by 120 degrees from said phase of each other oscillator signal.

7. The multiphase inductive power supply system of claim 1 wherein the phase of each oscillator signal is offset by 30 degrees from at least one other oscillator signal.

8. The multiphase inductive power supply system of claim 1, wherein said feedback is based on a power supply need of said remote device.

9. The multiphase inductive power supply system of claim 1, further comprising a load electrically connected to said phase combination circuit.

10. A multiphase inductive power supply that receives a feedback signal from a remote device, said multiphase inductive power supply comprising:
    a plurality of tank circuits, wherein each of said plurality of tank circuits includes a primary inductive coupler for inductively coupling to a secondary inductive coupler of the remote device;
    a multiphase inductive primary circuit energizes each of said plurality of tank circuits at a different phase such that said plurality of tank circuits are energized in staggered phases, said multiphase inductive primary circuit varies a timing of said energizing based on the feedback signal from the remote device in at least one of said plurality of tank circuits, wherein the feedback signal is received from the secondary inductive coupler of the remote device through said primary inductive coupler of at least one of said plurality of tank circuits.

11. The multiphase inductive power supply of claim 10 wherein said plurality of tank circuits are arranged in a tight overlapping triangular relationship so that energy from adjacent tank circuits cancels.

12. The multiphase inductive power supply of claim 10 wherein said plurality of tank circuits are arranged in a loose, linear fashion.

13. The multiphase inductive power supply of claim 10 wherein said plurality of tank circuits are arranged in a loose, non-overlapping, triangular fashion.

14. The multiphase inductive power supply of claim 10 wherein each phase is staggered at least 120 degrees apart.

15. The multiphase inductive power supply of claim 10 wherein each phase is staggered at least 30 degrees apart.

* * * * *